United States Patent
Fujiwara et al.

(10) Patent No.: US 10,318,989 B2
(45) Date of Patent: Jun. 11, 2019

(54) INFORMATION PROVIDING METHOD AND SYSTEM USING SIGNAGE DEVICE

(71) Applicant: TOSHIBA TEC KABUSHIKI KAISHA, Tokyo (JP)

(72) Inventors: Akihiko Fujiwara, Kawasaki Kanagawa (JP); Mika Hirama, Tokyo (JP); Masaaki Yasunaga, Suntou Shizuoka (JP); Tetsuya Nobuoka, Suntou Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 587 days.

(21) Appl. No.: 14/632,623

(22) Filed: Feb. 26, 2015

(65) Prior Publication Data

US 2015/0248700 A1    Sep. 3, 2015

(30) Foreign Application Priority Data

Feb. 28, 2014   (JP) ................................. 2014-037885

(51) Int. Cl.
G06Q 30/00 (2012.01)
G06Q 30/02 (2012.01)

(52) U.S. Cl.
CPC ..... *G06Q 30/0257* (2013.01); *G06Q 30/0261* (2013.01); *G06Q 30/0267* (2013.01)

(58) Field of Classification Search
None
See application file for complete search history.

(56) References Cited

U.S. PATENT DOCUMENTS

| | | | | |
|---|---|---|---|---|
| 2005/0144259 A1* | 6/2005 | Buckley | ............ | G06F 17/30861 709/219 |
| 2011/0289535 A1* | 11/2011 | Saffari | ................. | H04N 21/235 725/61 |
| 2012/0262370 A1 | 10/2012 | Ko et al. | | |
| 2014/0059499 A1* | 2/2014 | Kim | .................... | G06F 3/04812 715/862 |
| 2014/0333508 A1* | 11/2014 | Yuann | ................... | G06F 3/1407 345/2.1 |
| 2015/0077326 A1* | 3/2015 | Kramer | ................. | G06F 3/0325 345/156 |

FOREIGN PATENT DOCUMENTS

| | | |
|---|---|---|
| CN | 102841757 A | 12/2012 |
| JP | 2012018457 A | 1/2012 |
| JP | 2013115545 A | 6/2013 |
| JP | 2013186573 A | 9/2013 |

OTHER PUBLICATIONS

Chinese Office Action dated Sep. 6, 2017, filed in Chinese counterpart Application No. 201510086830.5, 10 pages (with translation).

* cited by examiner

*Primary Examiner* — Meredith A Long
(74) *Attorney, Agent, or Firm* — Kim & Stewart LLP

(57) ABSTRACT

A method for providing information related to information displayed on a signage device to a mobile device carried by a user includes displaying on a screen of the signage device one or more images, establishing a connection between a mobile device and the signage device, displaying on the screen of the signage device a mark unique to the user, after the connection has been established, moving the mark on the screen in accordance with an operation of the mobile device by the user, and transmitting, to the mobile device, information related to an image at which the mark is located.

12 Claims, 6 Drawing Sheets

INFORMATION PROVIDING METHOD AND SYSTEM USING SIGNAGE DEVICE

CROSS-REFERENCE TO RELATED APPLICATION

This application is based upon and claims the benefit of priority from Japanese Patent Application No. 2014-037885, filed Feb. 28, 2014, the entire contents of which are incorporated herein by reference.

FIELD

Embodiments described herein relate generally to a technique that provides information using a signage device.

BACKGROUND

In a store or an event site, an image relating to merchandise or an event is exhibited using a signage device (e.g., electronic bulletin board). Such a signage device displays information under the control of a computer or the like. Displaying the information effectively to promote sales at the store and participation in an event is desired.

DETAILED DESCRIPTION

An embodiment provides a technique for improving usability of a signage device.

In general, according to one embodiment, a method for providing information related to information displayed on a signage device to a mobile device carried by a user includes displaying on a screen of the signage device one or more images, establishing a connection between a mobile device and the signage device, displaying on the screen of the signage device a mark unique to the user, after the connection has been established, moving the mark on the screen in accordance with an operation of the mobile device by the user, and transmitting, to the mobile device, information related to an image at which the mark is located.

In an exemplary embodiment, detailed information relating to an image is provided to a store visitor, an event participant, a passer or the like who visually recognizes the image on a signage device. The detailed information is transmitted to a portable terminal device carried by each person, and information from a user is received through a portable terminal device.

In the exemplary embodiment, basic applications such as a web browser or a camera application, which are usually pre-installed, are used in the portable terminal device. That is, installation of a special application is not necessary.

Further, display contents of the signage device according to the exemplary embodiment are determined by a server. The server executes a Web server application to provide an operation screen or a variety of detailed information to the portable terminal device.

Figure 1:
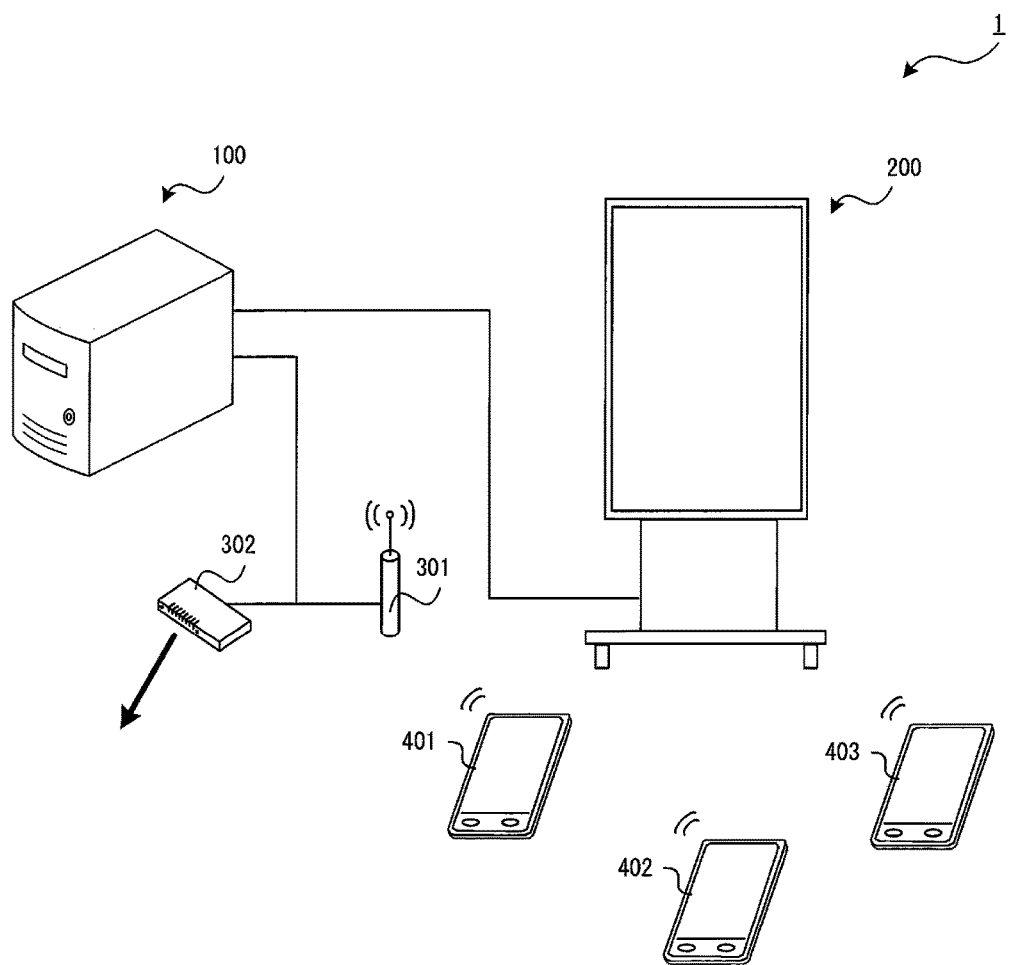
FIG. 1 illustrates configuration of an information providing system according to an exemplary embodiment.

Hereinafter, the exemplary embodiment will be described with reference to the accompanying drawings. FIG. 1 illustrates configuration of an information providing system according to an exemplary embodiment. An information providing system 1 includes a server 100, a signage device 200, an access point 301, and a router 302. The server 100 and the signage device 200 are connected to each other through a video input and output cable such as a high definition multimedia interface (HDMI, registered trademark) cable or a digital visual interface (DVI) cable. Further, the server 100 is connected to the access point 301 and the router 302 through a local area network (LAN) cable, for example. The server 100 and the signage device 200 may be connected to each other through the LAN cable.

The server 100 is a computer that provides information to portable terminal devices 401 to 403 carried by store visitors, event participants, or passersby through the signage device 200 or the access point 301. In addition, the server 100 acquires image data transmitted from the portable terminal devices 401 to 403 through the access point 301, and allows the signage device 200 to display an image corresponding to the image data. Further, the server 100 uploads the image data to a social networking service (SNS) site through the router 302. Communication between the server 100 and the portable terminal devices 401 to 403 may use a broadband line network without using the access point 301.

The signage device 200 is an electronic bulletin board that is located in commercial facility, for example, and is placed at a position where the signage device 200 may be visually recognized by passersby or the like in addition to store visitors or event participants. The signage device 200 displays an image according to a video signal output from the server 100. A specific display example will be described below. The signage device 200 may generate sound according to a sound signal output from the server 100.

The access point 301 is a communication base device for wireless communication between the server 100 and the portable terminal devices 401 to 403. In the exemplary embodiment, the access point 301 performs communication based on the standard of IEEE802.11, and performs encryption communication. The router 302 relays communication of the information providing system 1 with an external device. The server 100 uploads an image to the SNS site through the router 302.

The portable terminal devices 401 to 403 are smart phones carried by store visitors, event participants, or passersby (hereinafter, correctively referred to as users), but may be notebook-type computers, tablet-type computers, or the like. It is assumed that the portable terminal devices 401 to 403 may perform at least wireless communication and that a web browser and a camera application for image capturing are installed therein. The portable terminal devices 401 to 403 have a touch panel display and display an operation screen on the web browser developed on the touch panel display, acquire operation information by users through the touch panel display, and transmit the information to the server 100. Further, the portable terminal devices 401 to 403 transmit a captured image to the server 100 through the access point 301.

Figure 2:
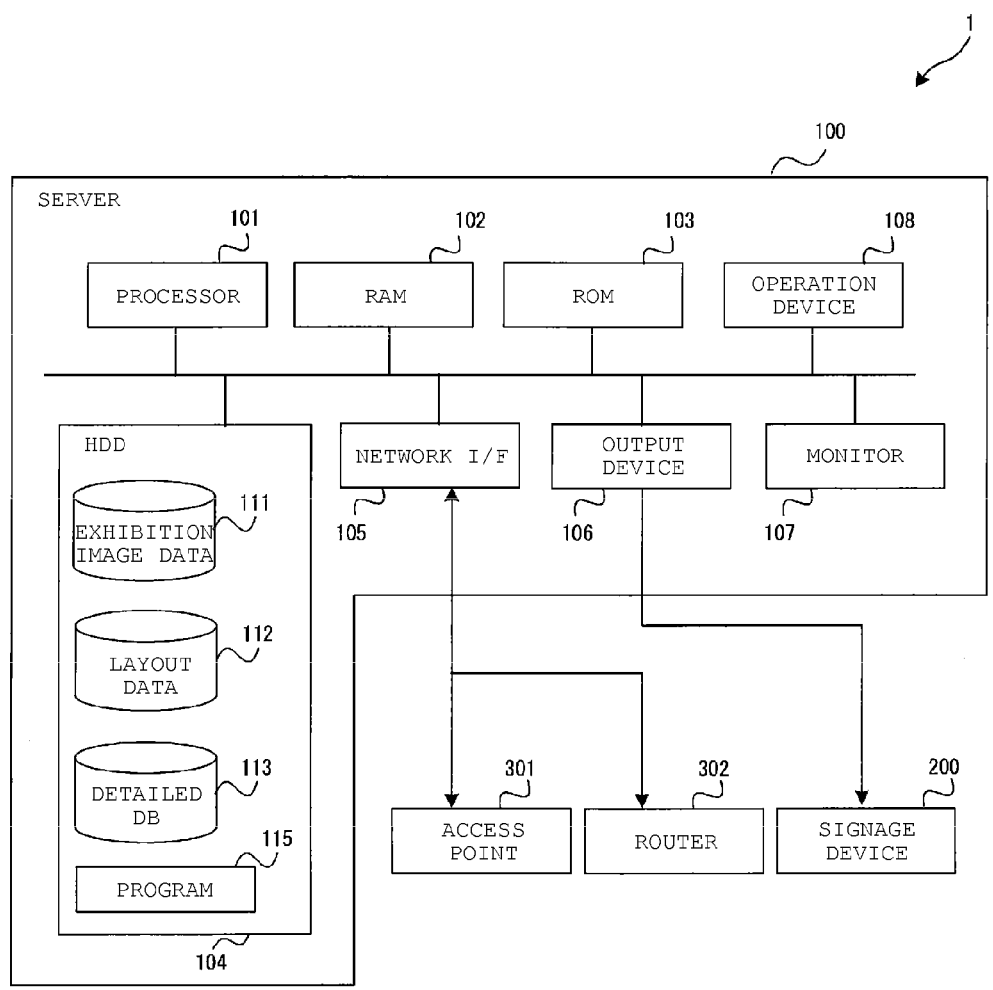
FIG. 2 is a block diagram of a server in the information providing system according to the exemplary embodiment.

A configuration of the server 100 will be described with reference to FIG. 2. The server 100 includes a processor 101, a random access memory (RAM) 102, a read only memory (ROM) 103, a hard disk drive (HDD) 104, a network interface (I/F) 105, an output device 106, a monitor 107, and an operation device 108. The processor 101 is an arithmetic unit such as a central processing unit (CPU). The processor 101 develops a program stored in the ROM 103 or a program 115 stored in the HDD to the RAM 102 to execute an arithmetic operation, and to thereby perform various functions in cooperation with each hardware. The RAM 102 is a main storage unit, and the ROM 103 is a memory unit that stores a system program or the like in a nonvolatile manner. The HDD 104 is an auxiliary memory unit that stores a program, data, or the like in a nonvolatile manner. The network I/F 105 is a LAN board and performs communication with the access point 301 and the router 302. The output device 106 is a device that includes an HDMI terminal or a DVI terminal and a controller that controls video output, and is connected to the signage device 200 through a cable. The monitor 107 and the operation device 108 (for example, a keyboard) serve as an operational display unit when a manager or the like of the server 100 performs maintenance.

In The HDD 104, exhibition image data 111, layout data 112, a detailed DB 113, the program 115 are stored in advance.

The program 115 provides a web server function, and includes a program group to be executed in accordance with receiving of an instruction from a client (herein, the portable terminal devices 401 to 403).

The exhibition image data 111 represents a data group, in which representative images of merchandise or an opening event to be displayed on the signage device 200 are included. The layout data 112 represents a data group that defines an disposition position or the like when an image or the like is displayed on the signage device 200, and for example, includes a markup language, a style sheet, or a script to be executed by the server 100 or the portable terminal device 200. The detailed DB 113 represents a database that stores detailed data correlated with each representative image of the exhibition image data 111. For example, in a store that sells clothes, a variety of information such as a file name of a representative image, a name or the price of clothes displayed by the representative image, the inventory state of the clothes for each color, a coordination example (combination example of store-recommended clothes), or a remarks column is stored as a single record in the detailed DB 113. In the remarks column, text information such as information indicating discount target product is stored. The variety of information in the record is detailed information to be transmitted to the portable terminal devices 401 to 403 of the users.

Figure 3:
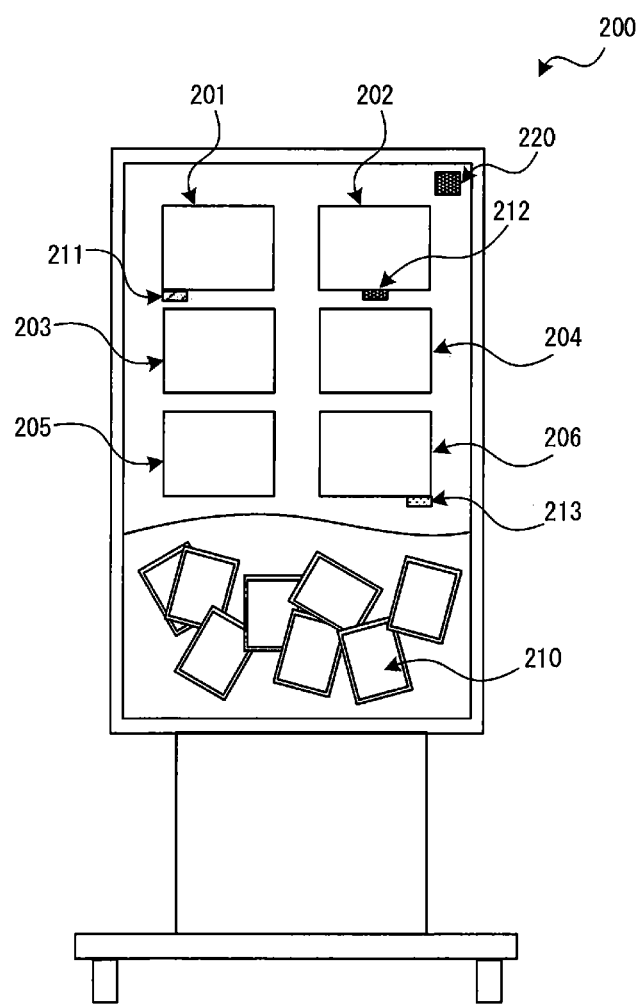
FIG. 3 illustrates a display example of a signage device in the information providing system according to the exemplary embodiment.

Next, a display example of the signage device 200 is illustrated in FIG. 3. In the following description, a store that sells clothes will be described as an example. The signage device 200 displays representative images 201 to 206 on an upper part of the screen. The representative images 201 to 206 are snap photos or the like of a model who wears clothes for sale, which are aligned in longitudinal and transverse directions of the screen to be displayed like a list. The representative images 201 to 206 correspond to data in the exhibition image data 111 stored in the HDD 104. The server 100 acquires representative images designated in advance from the exhibition image data 111, and displays the representative images 201 to 206 on the signage device 200 according to the layout data 112. Further, the signage device 200 randomly disposes and displays photo images 210 transmitted by the users on a lower part of the screen. In this way, the representative images 201 to 206 and the photo images 210 are simultaneously displayed.

Figure 4:
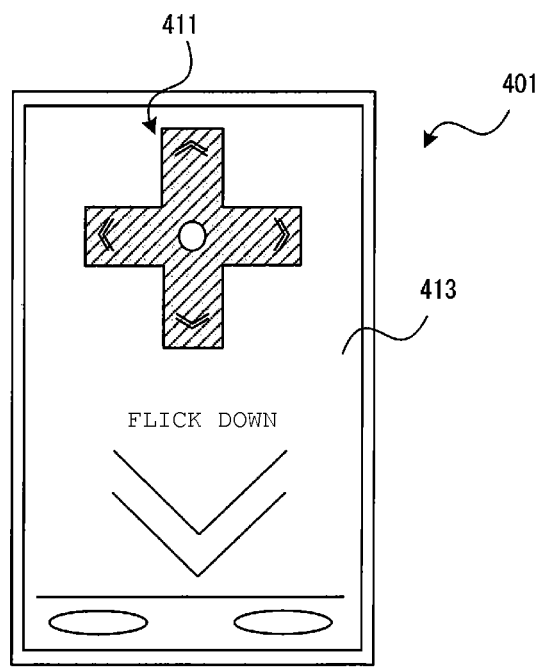
FIG. 4 illustrates a display example of a portable terminal device in the system according to the exemplary embodiment, which includes a cursor operation screen.

Cursors 211 to 213 illustrated in FIG. 3 are pointers that move according to an instruction from the portable terminal devices 401 to 403. Here, operations of the cursors 211 to 213 will be described. Here, it is assumed that the cursor 211 is operated using the portable terminal device 401. A user who visually recognizes display content of the signage device 200 operates the portable terminal device 401 to capture a QR code 220 to acquire a URL of the server 100 therefrom, and to access the server 100 using the web browser. The server 100 transmits data (including script) in the layout data 112 to the portable terminal device 401 using the access from the portable terminal device 401 as a trigger. The portable terminal device 401 executes the transmitted script in the web browser and displays an operation screen illustrated in FIG. 4, accordingly. The user can operate a displayed cross key 411 on a touch panel display 413. This operation information is sequentially transmitted to the server 100, and the server 100 moves the cursor 211 according to the operation information.

The server 100 allows simultaneous operations from plural terminals. That is, the above-mentioned operation may be simultaneously performed in the portable terminal devices 402 and 403. As it is not easy to recognize which cursor each user operates when plural users perform the operation, in the exemplary embodiment, color of each cursor illustrated in FIG. 3 is set to the same color as that of the cross key 411 illustrated in FIG. 4. In this example, the portable terminal device 401 operates the cursor 211, and the other portable terminal devices 402 and 403 operate the cursors 212 and 213, respectively. In this example, the display color of the cross key 411 and the color of the cursors are set to the same color, but the exemplary embodiment is not thereto. It is sufficient if the portable terminal device displays the same color as that of the cursors so that the user may understand the display content.

Subsequently, an example of an operation carried out by and a screen displayed in the portable terminal device 401 will be described. If the user moves the cursor to point a desired certain representative image and flicks the cursor downward on the operation screen illustrated in FIG. 4, the server 100 that accepts this operation information acquires detailed data correlated with the selected representative image from the detailed DB 113. The server 100 transmits the acquired detailed data and the representative image to the portable terminal device 401, and also acquires predetermined data from the layout data 112 and transmits the predetermined data.

Figure 5:
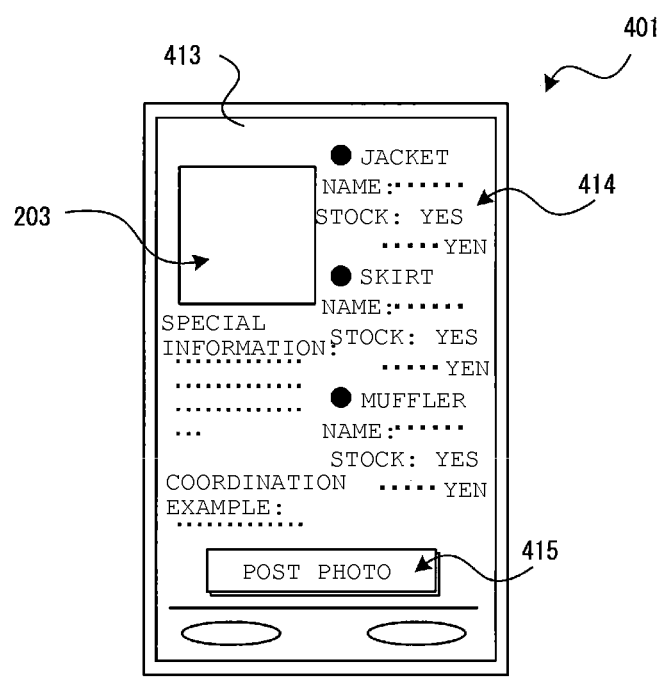
FIG. 5 illustrates a display example of the portable terminal device, which includes a screen shown after selection of a representative image.

The portable terminal device 401 displays the representative image (here, it is assumed that the representative image 203 illustrated in FIG. 3 is selected) and the detailed data 414 according to transmitted layout data, as illustrated in FIG. 5. For example, if the representative image 203 is an image of a model who wears a jacket, a skirt, a muffler, or the like, the detailed data 414 is data registered in the detailed DB 113, such as a name of each product, the inventory state of each product, and the price of each product. Further, a coordination example in the same record is also displayed, and a remarks column is displayed as special information.

The user tries on the clothes with reference to the representative image 302, the coordination example, or the like, and then, selects an icon 415 illustrated in FIG. 5. Then, the camera application for image capturing starts to capture an image of the user wearing the tried-on product or the like. The captured image data is transmitted to the server 100, and a corresponding image is displayed as the photo image 210 in the lower part of the screen of the signage device 200. Further, the server 100 may upload the captured image data transmitted from the portable terminal device 401 to the SNS site. In the exemplary embodiment, when an account for the information providing system 1 is registered in the SNS site in advance, the captured image data is uploaded using the registered account. The server 100 transmits an uploaded link destination URL to the portable terminal device 401. As a result, the user may notify a friend or a third party of a variety of information (tried-on clothes, store name, or the like) using the SNS application.

Next, an operation example of the server 100 will be described with reference to FIGS. 6 and 7. Each operation is performed as the processor 101 develops the program 115 stored in the HDD 104 in advance to the RAM 102 and executes an arithmetic operation of the program.

Figure 6:
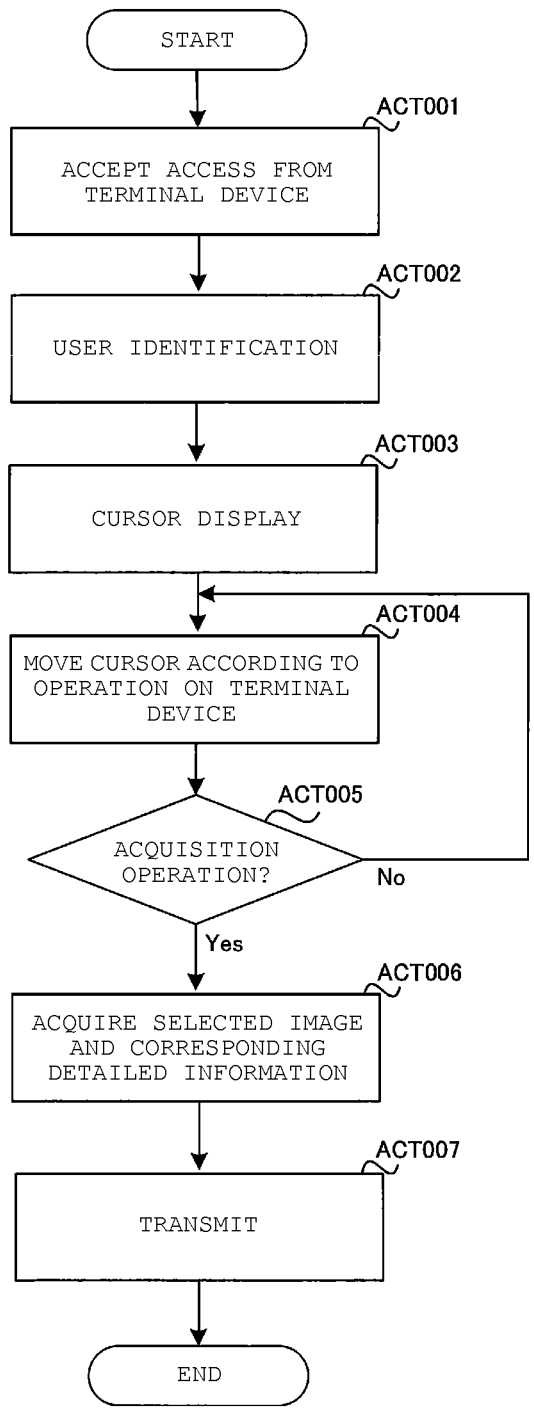
FIG. 6 is a flowchart illustrating an operation carried out by the server according to the embodiment.

FIG. 6 is a flowchart illustrating an operation example until a user acquires detailed information. The processor 101 accepts access from the portable terminal device through the network I/F 105 (ACT 001). In this example, it is assumed that the access is performed from the portable terminal device 401. Further, the processor 101 also acquires information for identifying the user from the portable terminal device 401. The user identification information is stored in the portable terminal device 401 based on a technique such as Cookie, for example. When a new access is performed, new user identification information is stored in the portable terminal device 401.

The processor 101 identifies the user based on the transmitted user identification information (ACT 002). The identification of the user is reflected to the cursor color or the like, for example. The processor 101 allocates the color for the current use of the cursor, when the same cursor color as that of the previous use is not used by any user. The user identification may be performed based on Cookie as in the above example, or HTTP based user authentication may be performed. Further, by acquiring a terminal unique ID or the like, collation with registration information or previous access information may also be performed.

The processor 101 of the server 100 controls the signage device 200 to display a cursor for the corresponding user (ACT 003). Further, the processor 101 causes the cursor to move according to the operation information of the portable terminal device 401 received through the network I/F 105 (ACT 004). The processor 101 repeatedly executes ACT 004 until information indicating the acquisition operation (flick down operation) is received (ACT 005, loop of No). If the acquisition operation is received (ACT 005, Yes), the processor 101 acquires detailed information corresponding to a selected representative image from the detailed DB 113 and the selected representative image from the exhibition image data 111 (ACT 006), and transmits the acquired data to the portable terminal device 401 (ACT 007). The processor 101 specifies a record in the detailed DB 113 based on a file name of the representative image to acquire the detailed information.

Figure 7:
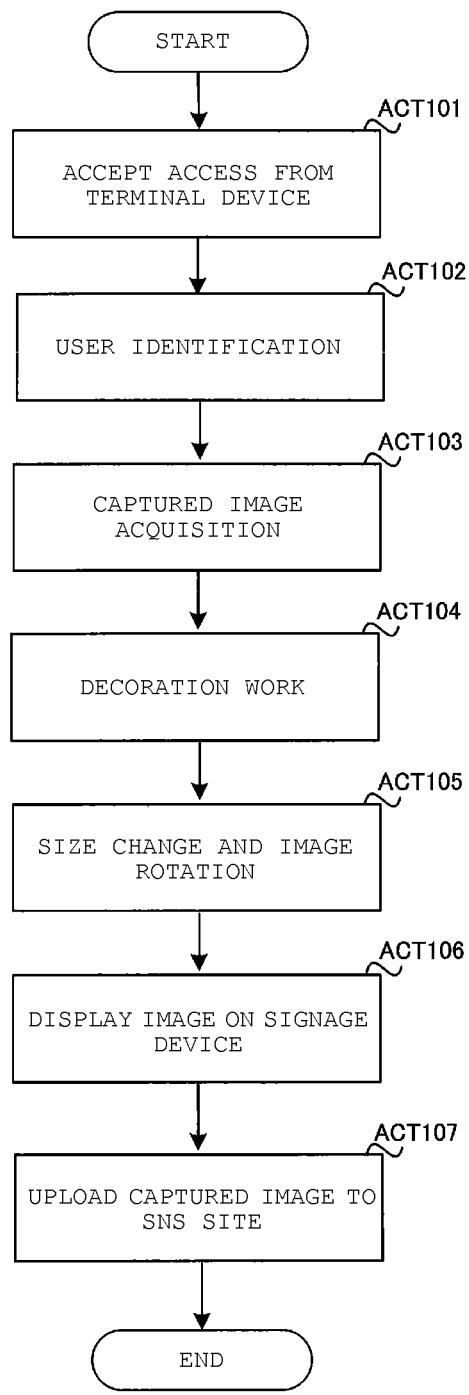
FIG. 7 is a flowchart illustrating an operation carried out by the server when an image is received from a portable terminal.

FIG. 7 is a flowchart illustrating an operation example when photo image data generated by a user is received. The processor 101 accepts access from the portable terminal device 401 (ACT 101), and identifies the user based on user identification information simultaneously transmitted (ACT 102). As the network I/F 105 receives the captured image, the processor 101 temporarily stores the captured image in the RAM 102 (ACT 103).

The processor 101 performs decorating work such as provision of a photo frame or the like with respect to the captured image (ACT 104). When the size of the captured image is large, the processor 101 changes the size of the captured image to a defined size and rotates the image (ACT 105). The image rotation is performed so that the image is not inverted up and down. The processor 101 controls the signage device 200 to display the image subjected to the processes of ACTs 104 and 105 (see the photo image 210 in FIG. 3) (ACT 106). The disposition position of the photo image is randomly determined as illustrated in FIG. 3. When the photo image has been already displayed, a new photo image may be overlapped thereon.

The processor 101 controls the network I/F 105 to upload the captured image to the SNS site (ACT 107). Here, the uploaded image may be the captured image received in ACT 103 as it is, or may be an image after being subjected to a variety of processing.

With this configuration, the user may select a desired representative image from the signage device capable of being visually recognized by plural persons, and may easily provide detailed information based on the representative image. Further, by displaying the image captured by the user on the signage device, it is possible to provide a user participation type information providing system that is superior to one-way information providing system.

In the exemplary embodiment, the functions for achieving the exemplary embodiment are stored in the apparatus in advance, but the exemplary embodiment is not limited thereto. The same functions may be downloaded to the apparatus from a network, or the same functions may be stored in a recording medium to be installed to the apparatus. The recording medium may be any type of recording medium that is capable of storing a program and is readable by the apparatus, such as a CD-ROM. Further, the functions obtained by such installation or downloading in advance may be achieved in cooperation with an operating system (OS) or the like in the apparatus.

As described above, in the exemplary embodiment, it is possible to provide detailed information in addition to a simple image list to a user using the signage device. Thus, it is possible to promote a purchase desire or an event participation desire of the user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An information providing system comprising:
a signage device including a display screen;
a first mobile device to be operated by a user;
a server connected to the signage device and the mobile device via a network, the server configured to:
output a product image to the signage device for display on a portion of the display screen;

output a locator address of the server to the signage device for display on the signage device;

establish a direct connection between the first mobile device and the server via a web browser on the first mobile device;

control the signage device to display a cursor on the display screen of the signage device, the cursor being unique to the user of the first mobile device;

move the cursor on the display screen in accordance with an operation on the first mobile device by the user, the operation being first transmitted to the server by the web browser;

transmit, to the first mobile device, information related to the product image when the cursor is positioned by the user of the first mobile device over the product image; and receive image data from the first mobile device and control the signage device to display the image data on the display screen with the product image.

2. The information providing system according to claim 1, wherein
the connection to the first mobile device includes a wireless connection from the server to the first mobile device.

3. The information providing system according to claim 1, wherein
the image data is displayed on a different portion of the display screen from the product image.

4. The information providing system according to claim 1, wherein
the server is further configured to establish a connection to a second mobile device and control the signage device to display on the display screen a second cursor unique to a user of the second mobile device at the same time as the cursor unique to the user of the first mobile device.

5. The information providing system according to claim 4, wherein
a color of the cursor is different from a color of the second cursor.

6. The information providing system according to claim 1, wherein
the cursor is selected by the server according to a previous connection between the first mobile device and the server.

7. The information providing system according to claim 1, wherein the address of the server is a URL.

8. The information providing system according to claim 1, wherein the address of the server is displayed on the display screen as a QR code.

9. The information providing system according to claim 1, wherein the server is further configured to control the signage device to display a plurality of product images on the portion of the display screen.

10. The information providing system according to claim 1, wherein a script is transmitted by the server to the mobile device, the script is executed in the web browser, and the script permits the user of the first mobile device to move the cursor on the display screen.

11. The information providing system according to claim 1, wherein a position of the image data on the display screen is randomly determined.

12. The information providing system according to claim 4, wherein the server is further configured to receive image data from the second mobile device and to control the signage device to display the image data from the second mobile device on the display screen with the product image and the image data from the first mobile device.

* * * * *